United States Patent [19]

Kitazawa

[11] Patent Number: 4,710,823

[45] Date of Patent: Dec. 1, 1987

[54] DENSITY CONVERSION IN IMAGE REPRODUCTION

[75] Inventor: Yoshihiro Kitazawa, Kyoto, Japan

[73] Assignee: Dainippon Screen Mfg. Co., Ltd., Kyoto, Japan

[21] Appl. No.: 731,514

[22] Filed: May 7, 1985

[30] Foreign Application Priority Data

Jun. 8, 1984 [JP] Japan ................................ 59-118721

[51] Int. Cl.⁴ .............................................. H04H 1/40
[52] U.S. Cl. .................... 358/280; 358/283; 358/298
[58] Field of Search ............... 358/280, 287, 260, 284, 358/282, 283, 298; 382/54, 55

[56] References Cited

U.S. PATENT DOCUMENTS

| 4,328,426 | 5/1982 | D'Ortezio | 358/280 X |
| 4,366,506 | 12/1982 | Ejiri et al. | 358/280 X |
| 4,495,522 | 1/1985 | Matsunawa et al. | 358/280 |
| 4,533,942 | 8/1985 | Gall et al. | 358/78 |
| 4,533,958 | 8/1985 | Herget | 358/280 |
| 4,551,768 | 11/1898 | Tsuchiya et al. | 358/293 |

FOREIGN PATENT DOCUMENTS

| 0095514 | 12/1983 | European Pat. Off. . |
| 0102550 | 3/1984 | European Pat. Off. . |
| 3225415 | 2/1983 | Fed. Rep. of Germany . |
| 57-57081 | 4/1982 | Japan | 358/280 |
| 59-86965 | 5/1984 | Japan | 358/280 |
| 59-95768 | 6/1984 | Japan | 358/280 |
| 1280152 | 5/1972 | United Kingdom . |
| 1413340 | 12/1975 | United Kingdom . |
| 1466211 | 2/1977 | United Kingdom . |
| 1594346 | 7/1981 | United Kingdom . |

Primary Examiner—Edward L. Coles, Sr.
Attorney, Agent, or Firm—Lowe, Price, LeBlanc, Becker & Shur

[57] ABSTRACT

In converting image data density, image data obtained from an input scanning means are distributed into several groups, and then the logical sum of each of the groups is obtained.

8 Claims, 9 Drawing Figures

DENSITY CONVERSION IN IMAGE REPRODUCTION

FIELD OF THE INVENTION

The present invention relates to a density conversion apparatus and process in electronic image reproduction.

BACKGROUND OF THE INVENTION

It is well known that systems for reproducing images by means of binary image data processing usually differ in their recording densities (recording density is defined as the number of recording pixels consisting of solid and transparent dots in a certain area) respectively. Therefore an image reproducing system of a certain recording density must cope with input density data (corresponding to the number of input pixels consisting of solid and transparent dots) exceeding the capacity of that of the image reproducing system by converting the input density data to permissible recording density data.

In order to carry out such a density conversion process, there exists a method as shown in FIG. 9 by which every several pixels (marked by circles) of all the input pixels in the main and the sub-scanning directions (refer to FIG. 9(a)) are picked up to be used for recording a reproduction image as shown in FIG. 9(b). This assumes that all the pixels picked up in the input scanning process are utilized for recording. In the particular case of FIG. 9, four pixels (circled) out of twenty-five pixels (five pixels by five pixels) are picked up for the recording process.

However, this method is disadvantageous in reproducing a thin line like a rule establishing a line as shown in FIG. 9(b) intermittent or different from the original shown in FIG. 9(a). In order to resolve this drawback, Japanese Patent Laid Open No. 58-215165 provides a method by which a signal indicative of high and low levels for controlling a recording beam is obtained by comparing the average density value of a group of input pixels on each of which appropriate weight coefficients are imposed with a corresponding reference value.

However, the above-mentioned method, being capable of converting only data density in the sub-scanning direction, cannot be applied to main scanning. In addition, comparison between the average density and the reference density requires complex circuitry.

SUMMARY OF THE INVENTION

Accordingly it is an object of the present invention to provide an improved method of and apparatus for converting density in electronic image reproduction.

Another object of the present invention is to provide a method of and apparatus for converting density free of omission of any rulings or dots.

A further object of the present invention is to provide a simple method of and apparatus for carrying out density conversion without averaging weighted image data.

In order to satisfy the above objects, according to the technique of the present invention, image data of a plurality of pixels are first distributed into several groups, and the logical sum of each of the groups is obtained.

The image data of each of the pixel groups are obtained by regulating the image data of the scanning lines, shifting the image data in the main scanning direction by the number of the pixels in one scanning line, and then logically summing the image data of each group when the last pixel data of each group are shifted.

The pixels of one group can be either a pixel matrix of a composite number of the main and the sub-scanning directions (for instance, one group comprises 2×2 or 3×3 pixels) or be four pixel matrixes distributed from a pixel matrix of 5×5 pixels at a ratio of 3 to 2 of both the directions, i.e., main and sub-scanning directions.

The data regulating means is composed of a number of line memories of one fewer than that of the pixels of one pixel group submitted thereto in the sub-scanning direction, and so constructed that the output of each of the line memories is applied to a corresponding succeeding line memory.

The image data are shifted in a shifting means by a timing controller. The timing controller comprises a main scanning counter for counting main scanning clock pulses M, a main scanning decoder, a counter for counting sub-scanning clock pulses N, a sub-scanning decoder, and a gate turned on by the output of the above two decoders when the counters sum the data of the main and the sub-scanning directions. In this case, both the counters repeatedly count the main scanning direction pulses M and the sub-scanning direction pulses N, respectively.

When four pixel groups distributed from a pixel matrix of 5×5 pixels are placed into operation, there are used five bit counters as both the counters mentioned above. The gate is thus turned on when each of the counters counts up 2 or 4.

The present invention can also be applied to one direction factor, e.g., main scanning only, of a two-dimensional image reproduction.

The above and other features of the present invention can be appreciated more fully from the following detailed description when read with reference to the accompanying drawings.

DETAILED DESCRIPTION OF A PREFERRED EMBODIMENT

Figure 2:
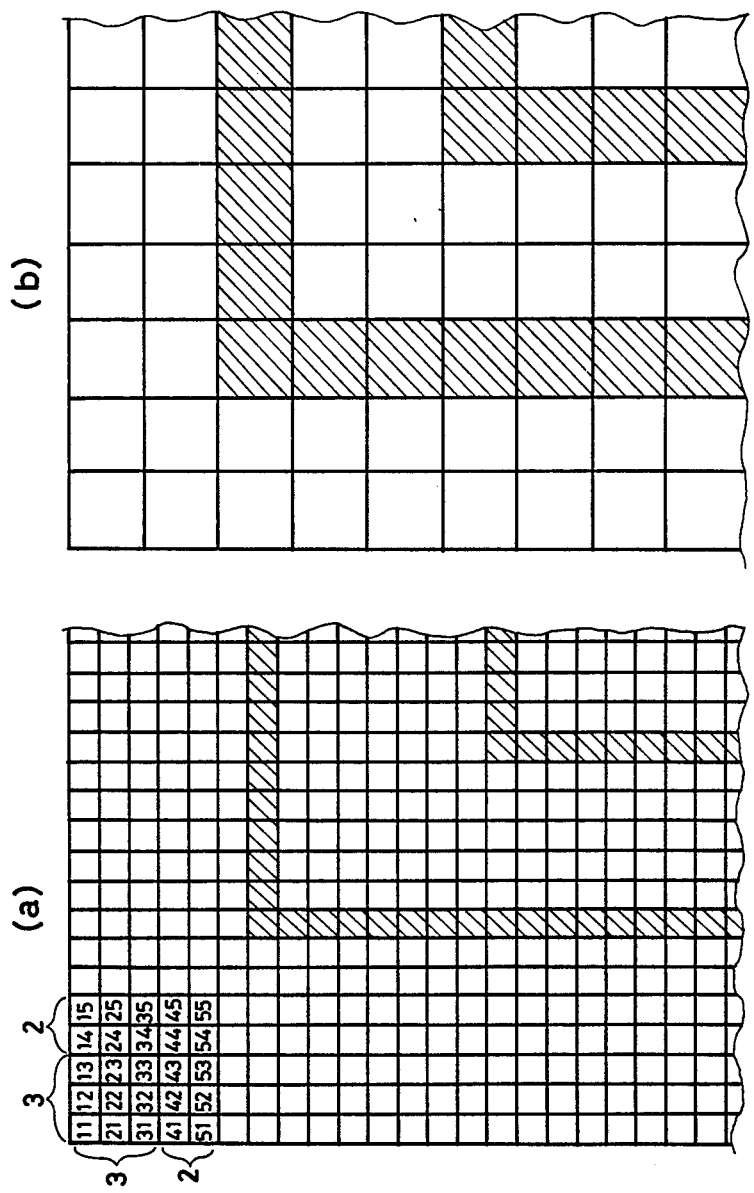
FIGS. 2(a) and (b) are representations of density conversion by means of the embodiment of FIG. 1.

FIG. 2 shows an embodiment of the present invention, in which an image shown in FIG. 2(a) is reproduced as an image reduced by 4/25 in density, as show in FIG. 2(b). More particularly, 5 (in the main scanning direction)×5 (in the sub-scanning direction) pixels of the original of FIG. 2(a), i.e., pixels numbered from 11 to 55, are distributed to four groups of: 3×3 pixels 11, 12, 13, 21, 22, 23, 31, 32 and 33; 3×2 pixels 14, 15, 24, 25, 34 and 35; 2×3 pixels 41, 42, 43, 51, 52 and 53; and 2×2 pixels 44, 45, 54 and 55, and the logical sums of the densities of the pixel groups are applied to produce the image of FIG. 2(b).

The following description is based on an assumption that the high, or "H", level of a binary image signal corresponds to a solid (called "black" hereinafter) dot and the low, or "L", level thereof corresponds to a transparent (called "white" hereinafter) dot.

Figure 1:
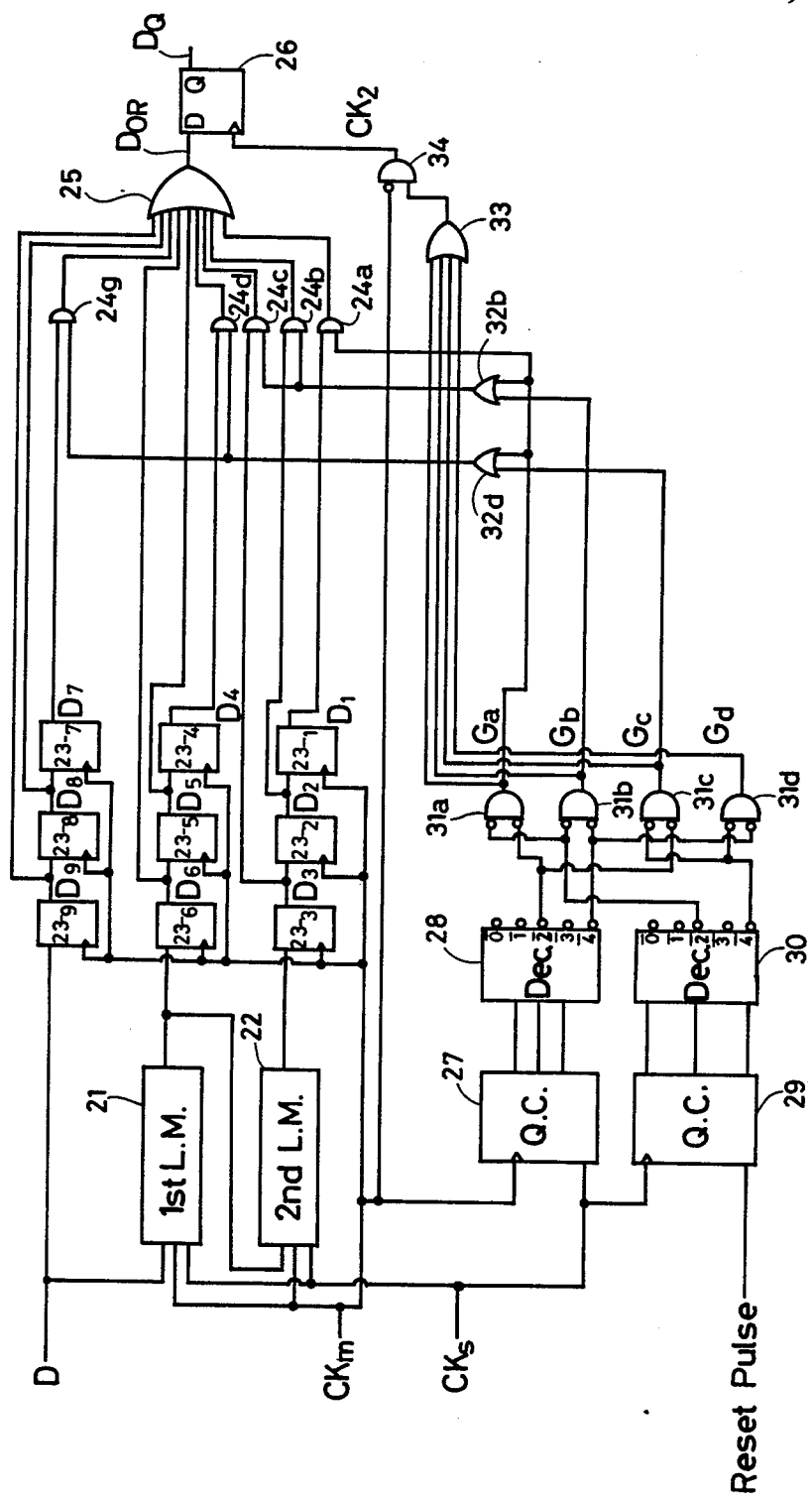
FIG. 1 is a circuit diagram of an embodiment of the present invention.
Figure 3:
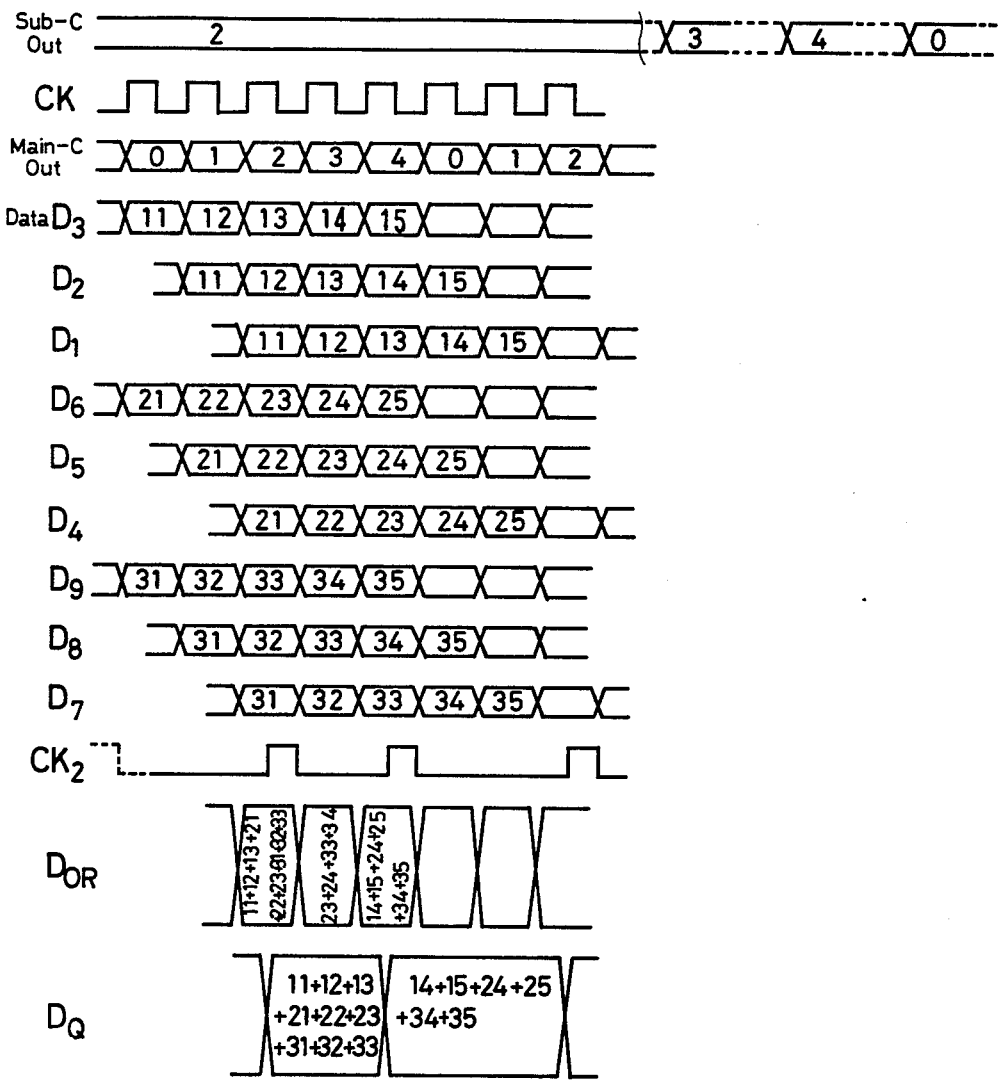
FIG. 3 is a timing chart for the embodiment of FIG. 1.

FIG. 1 shows a block diagram of a circuit for carrying out image reproduction depicted as in FIG. 2. FIG. 3 shows a timing chart thereof, in which the "+" marks shown in signals $D_{OR}$ and $D_Q$ indicate logical additions. At first, image data of the first scanning line are applied to a flip-flop circuit $23_{-9}$ which is the first one of the first level of flip-flop circuits $23_{-1}$ to $23_{-9}$ arranged three by three respectively for both the main and the sub-scanning directions. The image data are also applied, synchronized with a main scanning direction clock pulse signal $CK_m$, to certain addresses of a one-line memory 21. When image data of the first scanning line are transferred to the one-line memory 21, image data of the second scanning line begin to take the place of the image data of the first scanning line that are to be output to the flip-flop circuit $23_{-6}$ (which is the first one of the second level of flip-flop circuits), as well as to certain addresses of a one-line memory 22. When the image data of the first scanning line are transferred to the one-line memory 22, image data of the previous scanning line in certain addresses are output to the flip-flop circuit $23_{-3}$ (the first flip-flop of the third level). The image data of the consecutive three scanning lines input in the above manner to the flip-flop circuits $23_{-9}$, $23_{-6}$ and $23_{-3}$ are shifted respectively to the second flip-flop circuits $23_{-8}$, $23_{-5}$ and $23_{-2}$ and then to the third flip-flop circuits $23_{-7}$, $23_{-4}$ and $23_{-1}$ synchronized with the main scanning clock pulse $CK_m$. These image data are successively output via AND-gates 24 ($24_a$, $24_b$, $24_c$, $24_d$ and $24_g$) or directly to an OR-gate 25 as image data $D_1$ to $D_9$.

It should be noted in this connection that the count of internal address counters respectively of the one-line memories 21 and 22 are reset in synchronism with a sub-scanning clock pulse signal $CK_s$ to carry out the above-mentioned data transfer.

The main scanning clock pulse signal $CK_m$ is input to a five bit counter 27, the output of which is decoded by a decoder 28. In the meantime, the sub-scanning clock pulse signal $CK_s$ is input to another five bit counter 29, having an output decoded by a decoder 30. The output of a terminal "2" of the decoder 28 and the output of a terminal "2" of the decoder 30 are input to NAND-gate $31_a$. The output of a terminal "4" of the decoder 28 and the output of a terminal "2" of the decoder 30 are input to a NAND-gate $31_b$. The output of the terminal "2" of the decoder 28 and the output of the terminal "4" of the decoder 30 are input to a NAND-gate $31_c$. The output of the terminal "4" of the decoder 28 and the output of the terminal "4" of the decoder 30 are input to a NAND-gate $31_d$. The NAND-gates $31_a$, $31_b$, $31_c$ and $31_d$ respectively output gate control signals $G_a$, $G_b$, $G_c$ and $G_d$ when image data of the last pixel of each of said four pixel groups (the pixels 33, 35, 53 or 55 shown in FIG. 2(a)) are input to the flip-flop circuit $23_{-9}$.

The gate control signal $G_a$ turns on OR-gates $32_b$ and $32_d$ and then the AND-gates $24_a$, $24_b$, $24_c$, $24_d$ and $24_g$ to output the logical sum of the image data from all the flip-flop circuits $23_{-1}$ to $23_{-9}$ via the OR-gate 25. The gate control signal $G_b$ turns on the OR-gate $32_b$ and then the AND-gates $24_b$ and $24_c$ to output the logical sum of the image data from the flip-flop circuits $23_{-2}$, $23_{-3}$ $23_{-5}$, $23_{-6}$, $23_{-8}$ and $23_{-9}$ via the OR-gate 25. The gate control signal $G_c$ turns on the OR-gate $32_d$ and then the AND-gates $24_d$ and $24_g$ to output the image data from the flip-flop circuits $23_{-4}$ to $23_{-9}$ via the OR-gate 25. When the gate control signal $G_d$ is output, the logical sum of the image data from the flip-flop circuits $23_{-5}$, $23_{-6}$, $23_{-8}$ and $23_{-9}$ is output via the OR gate 25. Consequently, when the image data of the last pixel of each pixel group are input to the flip-flop circuit $23_{-9}$, the logical sum of the image data of the corresponding pixels are output via the OR-gate 25 to a flip-flop circuit 26 as a data signal $D_{OR}$. Then, each of the gate control signals $G_a$, $G_b$, $G_c$ and $G_d$ opens an OR-gate 33 and a gate 34 to output a clock pulse signal $CK_2$. This causes flip-flop circuit 26 to output the data signal $D_{OR}$ as a data signal $D_Q$ when the image data of the corresponding last pixel are input to the flip-flop circuit $23_{-9}$. The data output $D_Q$ also becomes "H" when at least one of the image data of the corresponding pixel group is "H" or becomes "L" when all the image data are "L".

The grouping of pixel image data can be managed by altering the outputs of the decoders 28 and 30 to be input to the NAND-gates $31_a$ to $31_d$ and the arrangement of the OR-gates $32_b$ and $32_d$ and the AND-gates $24_a$, $24_b$, $24_c$, $24_d$ and $24_g$.

Figure 5:
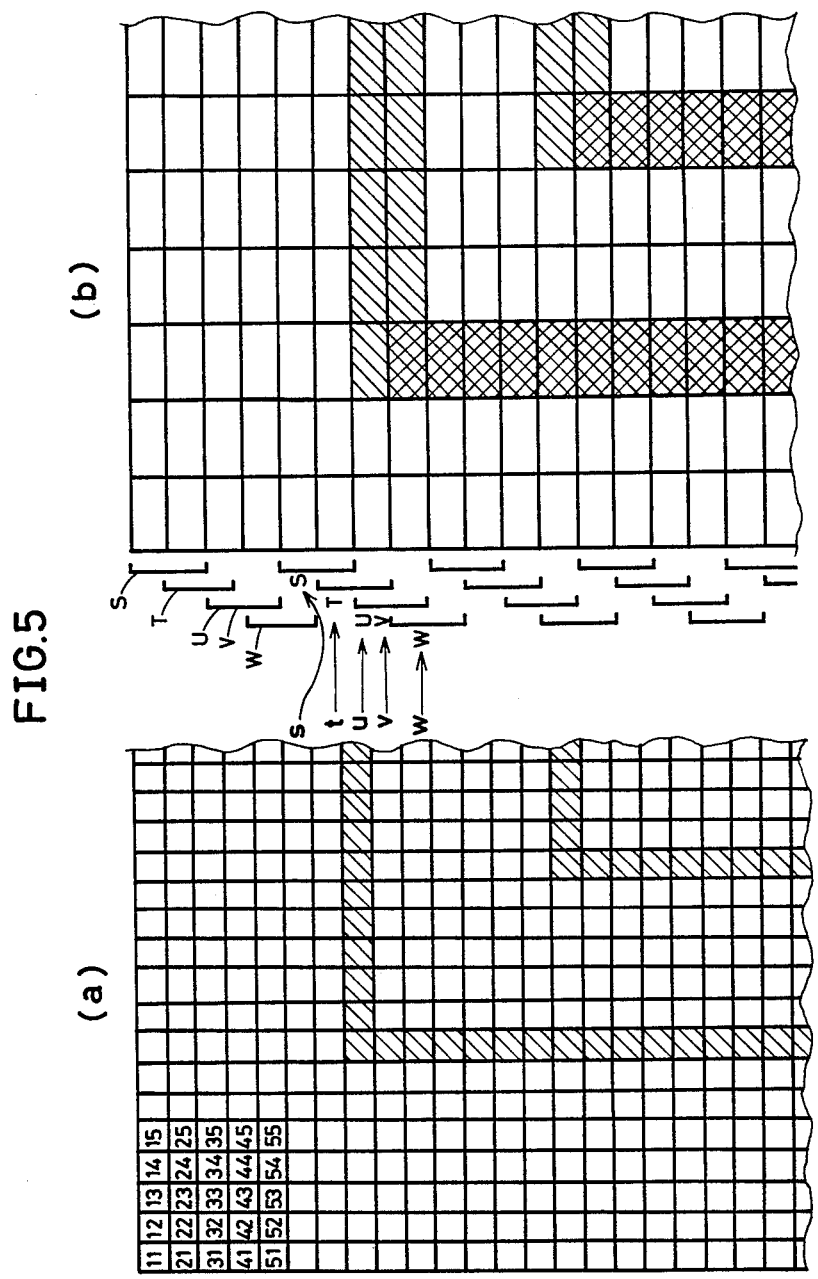
FIGS. 5(a) and (b) are representations of density conversion by means of the embodiment of FIG. 4.

FIG. 5 shows another embodiment of the present invention, in which an image shown in FIG. 5(a) is reproduced as an image as shown in FIG. 5(b) reduced by 2/5 in density in the main scanning direction. Density conversion of the sub-scanning direction factor is described hereinafter. At first, the logical sum of image data of three consecutive pixels 11, 12 and 13 of the first scanning line is output, then the sum of two (three) consecutive pixels 14 and 15 (14, 15 and 16) is output. Then the logical sum of image data of three consecutive pixels 21, 22 and 23 of the second scanning line is output and the sum of two (three) consecutive pixels 24 and 25 (23, 24 and 25) is output. In the same manner, the logical sum of image data of every three and two (three) pixels of the third and subsequent scanning lines are obtained to reproduce an image, as shown in FIG. 5(b).

Figure 4:
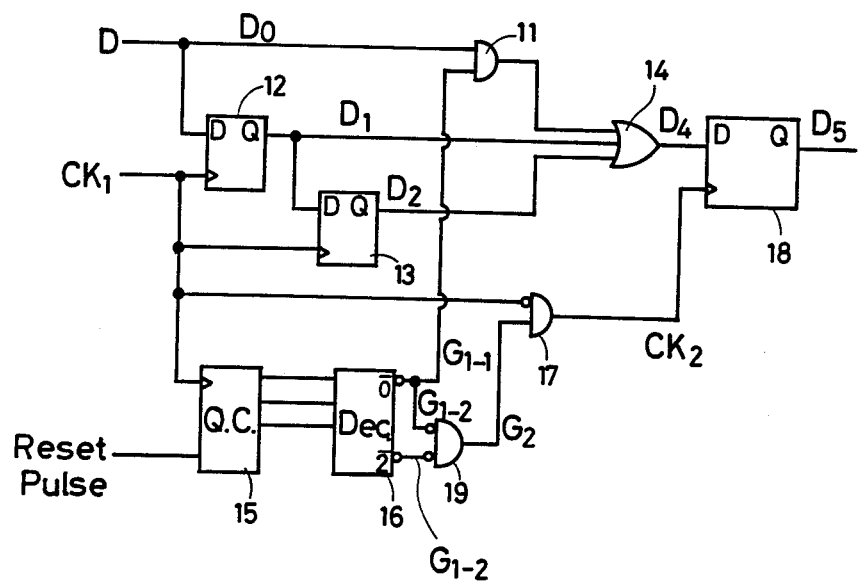
FIG. 4 is a circuit diagram of another embodiment of the present invention.
Figure 6:
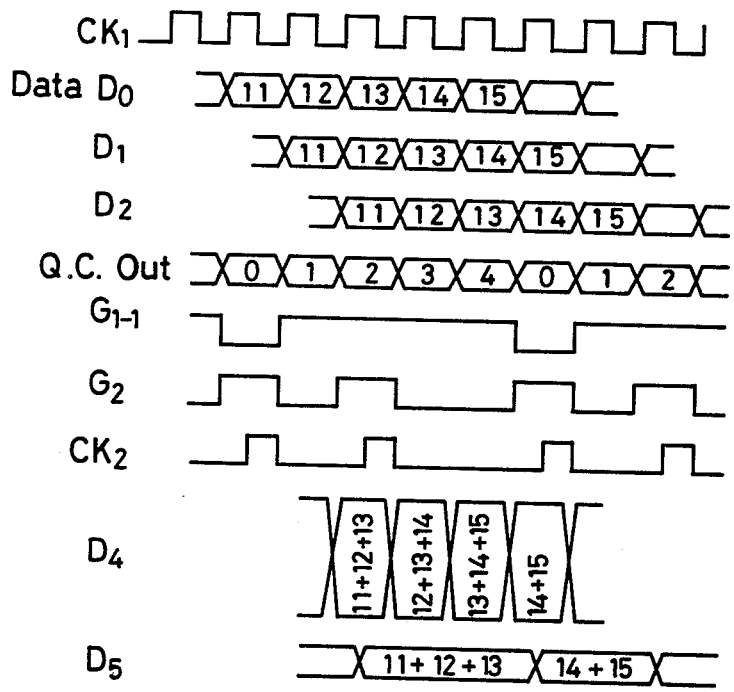
FIG. 6 is a timing chart on the embodiment of FIG. 4.

FIG. 4 is a block chart of a circuit for carrying out image reproduction as depicted in FIG. 5, while FIG. 6 is a timing chart thereof. In FIG. 4, pixel image data $D_0$ are input to an AND-gate 11 as well as to a flip-flop circuit 12. The flip-flop circuit 12 receives the image data $D_0$ synchronized with a clock pulse signal $CK_1$, and outputs the same to an OR-gate 14 as image data $D_1$ synchronized with the next pulse of the clock pulse signal $CK_1$. The image data $D_1$ from the flip-flop circuit 12 are also input to another flip-flop circuit 13, which outputs the same to the OR-gate 14 as image data $D_2$ synchronized with the second next pulse of the clock pulse signal $CK_1$. The clock pulse $CK_1$ is now input to a five bit counter 15 having an output decoded by a decoder 16. The decoder outputs a gate control signal $G_{1-1}$ from a terminal "0" and another gate control signal $G_{1-2}$ from a terminal "2". The gate control signal $G_{1-1}$ is input to said AND-gate 11 to terminate input of the image data $D_0$ to the OR-gate 14 every fifth pixel. Meanwhile, the gate control signal $G_{1-2}$ is input to NAND-gate 19 to form, with the other input $G_{1-1}$ thereto, a gate control signal $G_2$ which is synchronized with the outputs of the terminals "0" and "2" of the decoder 16. The control signal $G_2$ together with an inverted pulse of the clock pulse $CK_1$ is input to a gate 17 to form a clock pulse signal $CK_2$ that controls a flip-flop circuit 18.

The flip-flop circuit 18 receives image data $D_4$ from the OR-gate 14 synchronized with the risetime of the clock pulse $CK_2$ and then outputs the same as image data $D_5$. Since there are inputs of the image data $D_0$, $D_1$ and $D_2$ to the OR-gate 14, the image data $D_5$ comprises the logical sum of the three image data, by which a reproduction image is recorded.

It should be noted that although the above-mentioned embodiment is based on a manner of picking up image data of the first three pixels and further that of the remaining two pixels out of five, the image data of the subsequent three pixels (for instance, the pixel 14, 15 and 16 of the first scanning line) rather than that of the succeeding two pixels, can be picked up in the second stage, by eliminating the AND-gate 11 from the embodiment of FIG. 4.

By applying the image data obtained in the above manner to a recording unit controlled by the clock pulse signal $CK_2$ having a frequency two-fifths that of a clock pulse to be employed in a recording unit for recording a reproduction image, as shown in FIG. 5(a), in combination with a sub-scanning method as described below, a reproduction image as shown in FIG. 5(b) can be recorded.

In accordance with a second embodiment of the invention, the following method can be adopted in the sub-scanning direction, in which no density conversion is carried out.

Thus, as shown in FIG. 5, image data of five consecutive sub-scanning lines s, t, u, v and w respectively are used for recording sub-recording lines S, T, U, V, and W of two and a half times as wide as the counterpart of the original, when the adjoining two sub-recording lines are partially overlapped by one-half the width of a sub-recording line. It should be noted at this juncture the third sub-recording line is recorded using the image data of the third and fourth sub-scanning lines of the original in order not to drop out the image data of all scanning lines.

Figure 7:
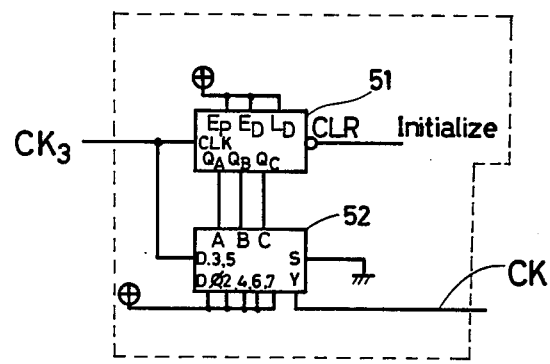
FIG. 7 is a circuit for generating a sub-scanning recording control pulse.
Figure 8:
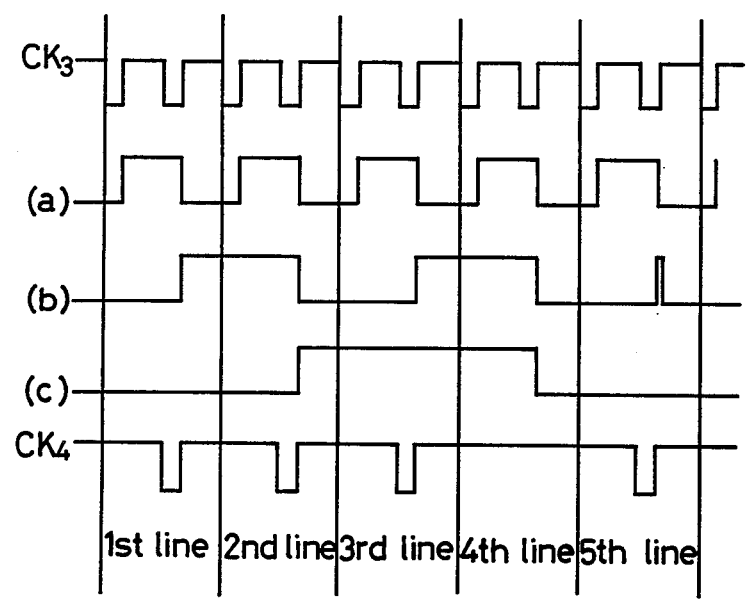
FIG. 8 is a timing chart for the circuit of FIG. 7.
Figure 9:
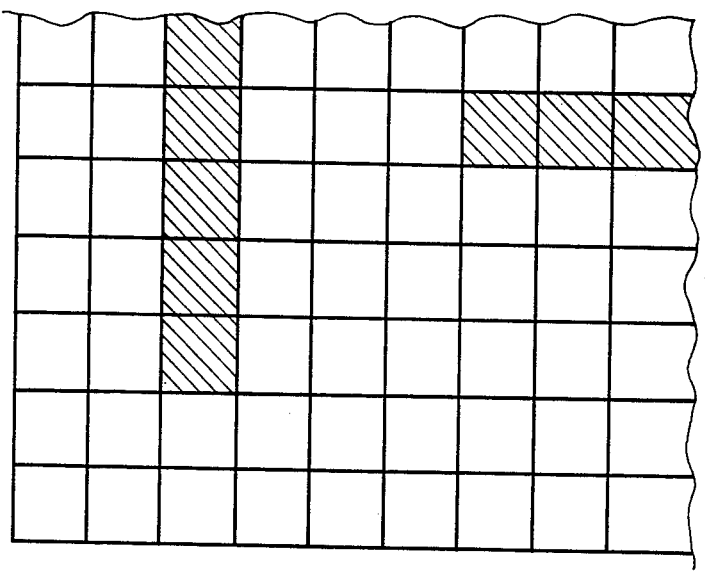
FIGS. 9(a) and (b) are representations of a conventional density conversion method.
Figure 9:
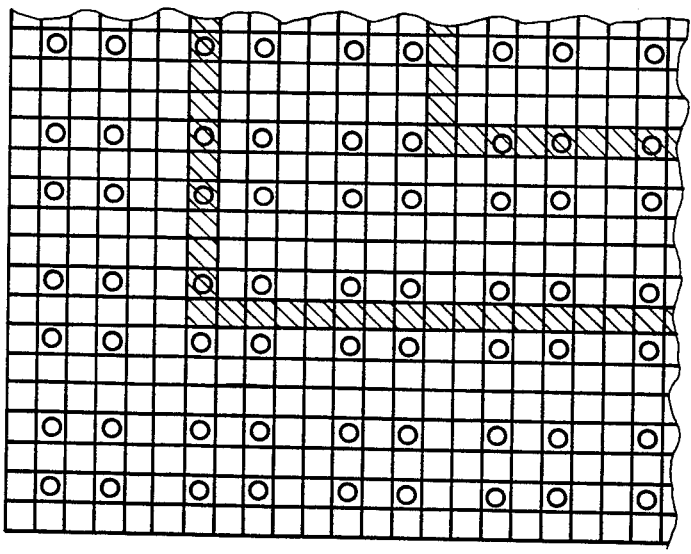

To place the above-mentioned sub-scanning method into practice, a circuit as shown in FIG. 7 can be adopted, by which a sub-scanning pulse signal $CK_4$ is generated every second pulse of a normal sub-scanning pulse signal $CK_3$ except every fourth pulse of the pulse signal $CK_3$. The circuit of FIG. 7 is composed of a counter 51 and a gate 52 which produces pulse waveforms, as shown in the timing chart of FIG. 8.

In both the above-mentioned embodiments, the density conversion ratio, described as being 2/5, can of course be varied.

Density conversion of a positive thin line image (for instance a black ruling line on a white background) is carried out by obtaining the logical sum of each pixel group, while density conversion of a negative thin line image (for instance a white ruling line on a black background) is carried out by taking the logical product of each pixel group, An outline image can be obtained in a combination Exclusive-OR circuit and OR-circuit.

An image data obtained directly from an input scanning device or via an image processor can be an input to each of the embodiments of FIGS. 1 and 4.

As mentioned above, the present invention is suitable for coarse image reproduction in a certain stage of an image reproduction process.

The present invention featuring use of AND-gates and OR-gates is less expensive than a circuit for carrying out weighted coefficient averaging of image data.

The present invention can also be applied to image reproduction together with magnification conversion.

In this disclosure, there is shown and described only the preferred embodiments of the invention, but as aforementioned, it is to be understood that the invention is capable of use in various other combinations and environments and is capable of changes or modifications within the scope of the inventive concept as expressed herein.

I claim:

1. A method for converting density in image reproduction, comprising the steps of:
   scanning an original to obtain binary image data;
   distributing into several groups binary image data of several pixels to be recorded two dimensionally in main and sub-scanning directions;
   obtaining a logical sum of the image data belonging to each of the pixel groups to generate a recording signal; and
   modulating an output device using the recording signal to produce a reproduction image,
   wherein image data of five by five pixels in the main and the sub-scanning directions are distributed into four groups by a ratio of three to two in both the main and sub-scanning directions.

2. A method for converting density in image reproduction, comprising the steps of:
   scanning an original to obtain binary image data;
   distributing binary image data of several pixels of a main scanning direction into several groups;
   obtaining a logical sum of the image data belonging to each of the pixel groups to generate a recording signal; and
   modulating an output device using the recording signal to produce a reproduction image;
   wherein image data of five pixels in the main scanning direction are distributed into two groups by a ratio of three to two.

3. An apparatus for converting density in image reproduction, comprising:
   means for scanning an original to obtain binary image data;
   data regulating means for regulating binary image data of a certain number of pixels, which belong to one of several groups distributed from a plurality of pixels to be recorded two dimensionally in main and sub-scanning directions, the certain number of pixels being in the scanning lines in the sub-scanning direction of the group to be processed;
   data shifting means for shifting image data obtained from the data regulating means in the main scanning direction;
   timing controlling means responsive to the data shifting means for developing image data of all the pixels of the group to be processed when the image data of the last pixel belonging to the group to be processed are input to the shifting means;
   logical summing means for obtaining a logical sum of said image data to obtain a recording signal; and
   means for modulating an output device using the recording signal to produce a recordation image.

4. An apparatus as recited in claim 3, said data regulating means including a plurality of line memories connected serially, each line memory having an image data capacity of one scanning line, and means for transferring said image data from each of said memories to said data shifting means, the data regulating means being constructed such that the image data of each of the scanning lines are to be input to said line memories in parallel simultaneously together with the image data identical to the image data input to the first line memory.

5. An apparatus as recited in claim 3 in which the timing controlling means comprises:
   (a) first counting means for repeatedly counting pulses of a main scanning clock pulse signal corresponding to the number of the pixels in the main scanning direction of each of pixel groups;
   (b) second counting means for repeatedly counting pulses of a sub-scanning clock pulse signal corresponding to the number of the pixels in the subscanning direction of each of the pixel groups;
   (c) first decoding means for decoding the output of the first counting means;
   (d) second decoding means for deconding the output of the second counting means;
   (e) gate means for applying image data of the pixels in each of the pixel groups to the logical summing means according to the outputs of the decoding means when the image data of the last pixel to be processed are input to the data shifting means.

6. An apparatus as recited in claim 3 in which the logical summing means is composed of an OR-gate.

7. An apparatus as recited in claim 5 in which the pixel groups comprise four pixel groups distributed at a ratio of 3:2 in both the main and the sub-scanning directions from a pixel matrix of 5 in the main scanning direction by 5 in the sub-scanning direction; the first and the second counting means being respectively five bit counters; and the gate means is turned on when the first decoding means outputs a signal representative of 2 or 4 and when the second decoder outputs a signal representative of 2 or 4.

8. An apparatus for converting density in image reproduction, comprising:
   means for scanning an original to obtain binary image data;
   data shifting means for shifting in a main scanning direction image data belonging to each of a pixel group distributed from a plurality of pixels to be recorded two-dimensionally in a main scanning direction and a sub-scanning direction;
   timing controlling means for generating from the data shifting means image data of all the pixels of the group to be processed when the image data of the last pixel belonging to the group to be processed are input to the shifting means;
   means for obtaining a logical sum of the image data output from the data shifting means to obtain a recording signal; and
   means for modulating an output device using said recording signal to produce a reproduction image.

* * * * *